United States Patent [19]

Udipi

[11] 4,309,517

[45] Jan. 5, 1982

[54] HYDROCARBYL ESTERS OF N-CYCLOPROPYL-N-HYDROCARBYLCAR-BAMIC ACIDS AS COUPLING AGENTS FOR CONJUGATED DIENE POLYMERIZATIONS

[75] Inventor: Kishore Udipi, East Longmeadow, Mass.

[73] Assignee: Phillips Petroleum Company, Bartlesville, Okla.

[21] Appl. No.: 199,762

[22] Filed: Oct. 23, 1980

[51] Int. Cl.³ ................................................ C08F 4/46
[52] U.S. Cl. ..................................... 525/374; 525/278; 525/314; 526/180
[58] Field of Search ....................... 525/374, 278, 314; 526/180

[56] References Cited

U.S. PATENT DOCUMENTS

| | | | |
|---|---|---|---|
| 3,730,951 | 5/1973 | Braude | 525/374 |
| 3,773,732 | 11/1973 | Dillenschneider | 260/85.1 |
| 3,968,092 | 7/1976 | Gruber | 525/374 |
| 4,160,077 | 7/1979 | Brooks et al. | 525/374 |
| 4,174,360 | 11/1979 | Moczygemba | 525/386 |

Primary Examiner—William F. Hamrock

[57] ABSTRACT

Hydrocarbyl esters of N-cyclopropyl-N-hydrocarbylcarbamic acids, such as ethyl N-benzyl-N-cyclopropylcarbamate, are effective coupling agents for conjugated diene polymerization systems employing an alkali metal-based initiator.

9 Claims, No Drawings

HYDROCARBYL ESTERS OF N-CYCLOPROPYL-N-HYDROCARBYLCARBAMIC ACIDS AS COUPLING AGENTS FOR CONJUGATED DIENE POLYMERIZATIONS

The invention pertains to the termination of conjugated diene polymerizations. In another aspect, the invention pertains to the coupling of alkali metal initiated polymerization systems.

BACKGROUND OF THE INVENTION

Polymers containing alkali metal termination groups can be treated with various functional reagents, including both difunctional and polyfunctional, to result in coupled linear or branched polymers of increased molecular weight. These coupling processes provide polymers exhibiting improved processing or other properties attributable to the increase in molecular weight and also to the branching.

A variety of coupling agents have been employed, which contain functional groups including ester groups. It is known that a monoester would be expected to produce linear coupling, or that a coupling agent including two ester groups derived from a dicarboxylic acid would be expected to produce a coupled polymer containing four branches, and so on.

BRIEF DESCRIPTION OF THE INVENTION

Unexpectedly, I have found that hydrocarbyl esters of N-cyclopropyl-N-hydrocarbylcarbamic acids not only are effective coupling agents for alkali metal initiated conjugated diene polymerizations, but that these coupling agents show evidence of tetra-chain coupling. I would have expected, at most, linear coupling, in view of the prior art.

DETAILED DESCRIPTION OF THE INVENTION

My invention is applicable to the coupling of living polymer molecules prepared from at least one conjugated diene employing an alkali metal initiator, such that the polymer has an alkali metal attached to the terminal monomer unit of the polymer chain.

In accordance with my invention, those substituted carbamic acid esters which can be termed hydrocarbyl esters of N-cyclopropyl-N-hydrocarbylcarbamic acids are employed as coupling agents for conjugated diene polymerizations, being added to the polymerization system after substantially complete conversion of the monomer or monomers involved.

The substituted carbamic acid esters suitable as coupling agents according to my invention are the hydrocarbyl esters of N-hydrocarbyl-N-cyclopropylcarbamic acids of the general structure

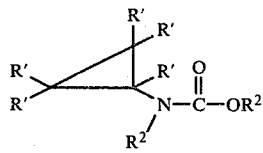

wherein each R' is the same or different and can be hydrogen or lower alkyl, such as methyl; and each $R^2$ is the same or different and can be alkyl, cycloalkyl, alkenyl, cycloalkenyl, aryl, and combinations thereof such as alkaryl. Each $R^2$ can be R' other than hydrogen, or typcially cyclohexyl, hexyl, pentadienyl, cyclopentadienyl, phenyl, and the like. The molecular size is non-limiting, though those having 6 to 20 carbon atoms per molecule presently are preferred for convenience in handling. Ethyl N-benzyl-N-cyclopropylcarbamate is an especially suitable, but non-limiting, example.

The amount of carbamic acid ester coupling agent employed broadly is in the range of about 0.03 to 20 mhm (gram millimoles per 100 grams of total monomers), preferably 0.5 to 5 mhm.

The conjugated diene polymers containing the terminal reactive alkali metal groups treated in accordance with my invention are polymers obtained by the polymerization of one or more conjugated dienes alone, or with any of the other vinylidene group-containing monomers known to be polymerizable with alkali metal based initiators, as is well known in the art. By "with" I mean either in admixture with, or in sequential polymerization. Preferably, the added comonomer, where employed, is the admixture with or by sequential polymerization with one or more monovinylarenes.

While the invention is applicable generally to the conjugated diene polymerizations employing an alkali metal initiator or alkali metal base initiator, I presently consider that my invention is particularly applicable to the rubbery polymers of conjugated dienes and resinous or rubbery copolymers with monovinylarenes, and most particularly polybutadienes and butadiene-styrene random or block copolymers prepared with an alkyllithium, preferably butyllithium, initiators to produce lithium-terminated living polymers. The conjugated dienes ordinarily contain 4 to 12 carbon atoms per molecule and those containing from 4 to 8 carbon atoms are preferred. Examples of such compounds include 1,3-butadiene, isoprene, 2,3-dimethyl-1,3-butadiene, piperylene, 3-butyl-1,3-octadiene, 2-phenyl-1,3-butadiene, and the like.

Copolymerizable vinylidene group-containing comonomers copolymerizable with alkali-based initiators are well-known.

The preferred monovinylarenes include styrene, α-methylstyrene, 1-vinylnaphthalene, 2-vinylnaphthalene and the alkyl, cycloalkyl, aryl, alkaryl, and aralkyl derivatives thereof in which the total number of carbon atoms in the combined substituents usually is not greater than 12. Examples of such substituted monomers include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and the like.

The conjugated dienes and/or the monovinylarenes and/or other comonomer can be polymerized alone or in admixture to form homopolymers, or random block copolymers. Monomers preferred are butadiene, isoprene, and styrene due to their availability and relatively low cost. The weight ratio of conjugated diene:monovinylarene monomers in copolymerizations can range from about 95:5 to 5:95.

Polymerization conditions known in the art can be employed for the polymerization of monomers with the alkali metal based initiators. Hydrocarbon diluents usually are employed. Pressure employed should be sufficient to maintain the polymerization admixture substantially in the liquid phase. Temperatures in the range of such as about −50° C. to 200° C. can be employed and depend on the monomers and initiator chosen, as well as the diluent, as is known in the art. Polymerization times vary over a wide range, generally dependent on other polymerization reaction parameters. It is presently preferred that the parameters for polymerization be selected so that substantially or essentially complete conversion of monomers to polymers is obtained prior to the coupling reaction.

My invention generally is applicable to processes for the polymerization of conjugated dienes alone, or conjugated dienes and monomers containing a vinylidene group copolymerizable therewith as discussed above, in the presence of a hydrocarbon diluent, employing an alkali metal as the initiator, or an organoalkali metal compound corresponding to the general formula $RM_x$ as initiator. For the organoalkali metal initiators, R is a hydrocarbyl radical and can be aliphatic, cycloaliphatic, or aromatic, and x is an integer of 1 to 4. M represents the alkali metal, and can be lithium, sodium, potassium, cesium, rubidium, presently preferably for commercial availability lithium.

The amount of initiator employed in producing the polymers or copolymers as known in the art can be varied over a wide range, and is generally selected dependent on the ultimate molecular weight for the resulting product, since the molecular weight of the living polymer-alkali metal substantially is inversely proportional to the amount of initiator employed. Hence, the amount employed is based on initiator level-polymer molecular weight relationships as known in the art. Typically, the amount will be in the range of about 0.1 to 40 gram milliequivalents per 100 grams of monomers polymerized.

Suitable diluents for the polymerization include any of the commonly employed paraffins, cycloparaffins, and/or aromatic hydrocarbons, such as 4 to 10 carbon atoms per molecule, typically pentane, hexane, cyclopentane, cyclohexane, isooctane, benzene, toluene, and the like. Presently preferred is hexane or cyclohexane or mixtures thereof.

Polymerization, of course, is conducted in the substantial absence of air or moisture, preferably under an inert atmosphere such as nitrogen, as is well known in the art.

The resulting living polymers contain, of course, one or more alkali metal terminated ends, wherein the alkali metal derived from the initiator is positioned at an end of the polymer chain. Of course, when a difunctional initiator is employed $RM_2$, then normally the living polymer will contain two ends each containing an alkali metal, and so on. Of course, all alkali metal entities do not ultimately result in a polymer-alkali metal, as there is some attrition from traces of oxygen, moisture, and the like. Any impurities present do tend to reduce the amount of alkali metal-terminated polymer formed.

CARBAMIC ACID ESTER TERMINATION (COUPLING)

The carbamic acid ester coupling agent can be introduced into the polymerization reaction mixture in any suitable manner. It can be added to the mixture at any time during or after the polymerization reaction and, it can be added in small quantities either intermittently or continuously during the course of the reaction. Typically it is added following completion of the monomer polymerization.

The carbamic acid ester must be added before any material such as water, acid, alcohol, antioxidant, or carbon dioxide is added to inactivate and/or remove the lithium atoms attached to the terminal monomer unit of the polymer chain. The temperature suitable for conducting the coupling reaction, i.e. reaction of polymer lithium with carbamic acid ester, can vary over a broad range and is conveniently the same temperature used for the monomer polymerization. Typically the coupling reaction is conducted at a temperature within the same range described earlier for the polymerization reaction. The time for conducting the coupling reaction can be up to 24 hours, preferably from about 10 seconds to 10 minutes. The pressure employed for the coupling reaction can be below or above atmospheric and is preferably and conveniently the autogenous pressure.

POLYMER RECOVERY

Following completion of the coupling reaction, the coupled polymer, which still contains bound alkali metal atoms in the form of O-M bonds, is treated to remove the alkali metal from the polymer. Suitable treating agents include alcohol, acid, water, antioxidant, and carbon dioxide, alone or in combination. The alkali metal-free polymer can be isolated by typical procedures, such as solvent flashing, coagulation using a non-solvent for the polymer such as isopropyl alcohol, or steam stripping.

Polymers produced by the process of this invention are suitable for preparing hoses, V-belts, tires, gaskets, shoe soles, wire coating, film, containers, tubes, and many other articles.

Example

The example following demonstrates various aspects of my invention. Specific materials employed, particular relationships, species, amounts, and the like, should be considered as further illustrative of my invention and not as limitative of the reasonable scope thereof.

EXAMPLE I

These runs illustrate the use of a hydrocarbyl ester of N-cyclopropyl-N-hydrocarbylcarbamic acid, ethyl N-benzyl-N-cyclopropylcarbamate, as a coupling agent for a conjugated diene polymer, a 25/75 butadiene styrene block copolymer.

Polymerization and coupling were conducted in 27 ounce beverage bottles, each equipped with perforated crown cap over a self-sealing rubber gasket. Ingredients were charged and the polymerizations conducted as described in Recipe I:

| Recipe I | |
|---|---|
| Step 1 | |
| Cyclohexane, parts by weight | 780 |
| Styrene, parts by weight | 75 |
| sec-butyllithium, mhm[a] | 2.0 |
| Polymerization temperature, °C. | 50, 70[b] |
| Polymerization time, minutes | 5, 30[b] |
| Step 2 | |
| 1,3-Butadiene, parts by weight | 25 |
| Polymerization temperature, °C. | 70 |
| Polymerization time, minutes | 45 |
| Step 3 | |
| Ethyl N-benzyl-N-cyclopropylcarbamate, mhm[a][c] | 0.75 |
| Reaction time, minutes | 45 |

[a]mhm = Gram millimoles per 100 grams of total monomers.
[b]Polymerized for 5 minutes at 50° C. and then for 30 minutes at 70° C.
[c]Added as a 0.5 M solution in toluene.

Following completion of Step 3, the polymerization solution was treated with 7.8 parts by weight of a 50:50 by volume toluene:isopropyl alcohol solution containing 2.5 weight percent 2,6-di-t-butyl-4-methylphenol (BHT) and 7.5 weight percent of tris(nonylphenyl) phosphite (TNPP). This treatment, which effectively replaced the lithium on the polymer with hydrogen, was followed by coagulation of the polymer using excess isopropyl alcohol, recovery of the polymer by filtration, and drying of the recovered polymer at 60° C. for 15 hours under reduced pressure.

A non-coupled control polymer was isolated by isopropyl alcohol coagulation of a sample of the polymerization reaction mixture following Step 2 and prior to adding the ethyl N-benzyl-N-cyclopropylcarbamate coupling agent in Step 3.

Properties of the coupled and non-coupled precursor polymers are shown in Table I.

TABLE I

Properties of Butadiene-Styrene Block Copolymers Coupled With Ethyl N-Benzyl-N-Cyclopropylcarbamate

| Sample | Molecular Wt.[a] | | Heterogeneity Index[b] | Inherent Viscosity[c] | Gel Wt. %[d] | Coupling Efficiency, %[e] |
|---|---|---|---|---|---|---|
| | $M_w$ | $M_n$ | | | | |
| Non-coupled[f] | 57,000 | 53,000 | 1.10 | 0.45 | 0 | — |
| Coupled | 92,000[g] | 70,000 | 1.31 | 0.60 | 0 | 45 |

[a]Molecular weights were determined from gel permeation chromatoraphy curves by a procedure described by G. Kraus and C. J. Stacy, J. Poly. Sci. A-2 10, 657 (1972), and G. Kraus and C. J. Stacy, J. Poly. Sci. Symposium No. 43, 329 (1973).
[b]Heterogeneity index = $M_w/M_n$. The higher the heterogeneity index, the broader the molecular weight distribution.
[c]Inherent viscosity was determined according to a procedure given in U.S. Pat. No. 3,278,508, col. 20, Note a with the modification that the solution was not filtered through a sulfur absorption tube but rather a sample of the solution was filtered through a fritted glass filter stick of grade C porosity and pressured directly into the viscometer.
[d]Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed widemouth, two-ounce bottle. A piece of folded quarter inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e. the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.
[e]Coupling efficiency is defined as the percentage of the living polymer molecules which are incorporated into the coupled polymer. It is calculated from the gel permeation chromatographic curve by dividing the area under the peak representing the coupled polymer by the areas under the peaks representing the coupled and uncoupled polymers and multiplying by 100.
[f]Sample of polymer recovered following Step 2 of Recipe I.
[g]A shoulder on the high molecular weight side of the gel permeation chromatograph curve of the coupled polymer indicates the presence of a small amount of a high molecular product having a weight average molecular weight of about 271,000.

These data and the gel permeation chromatograph curves of the coupled and uncoupled polymers illustrate that the carbamic acid ester does couple a significant amount of the polymer lithium which is present in the polymerization reaction mixture.

The disclosure, including data, illustrate the value and effectiveness of my invention. The Examples, the knowledge and background of the field of the invention, as well as the general principles of chemistry and other applicable sciences, have formed the bases to which the broad description of the invention including the range of conditions and generic groups of operate components have been developed, and further formed bases for my claims here appended.

I claim:

1. A process of treating a living alkali metal terminated conjugated diene polymer, wherein said conjugated diene polymer is a homopolymer or copolymer of a conjugated diene or of a conjugated diene with a comonomer containing a vinylidene group, which comprises contacting said living alkali metal-terminated conjugated diene polymer with an effective coupling amount of a hydrocarbyl ester of N-cyclopropyl-N-hydrocarbylcarbamic acid, thereby resulting in a coupled conjugated diene polymer of increased molecular weight.

2. The process according to claim 1 wherein said hydrocarbyl ester of N-cyclopropyl-N-hydrocarbylcarbamic acid is represented by

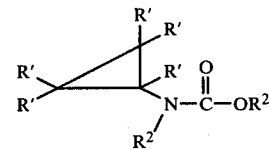

wherein each $R'$ is selected from hydrogen and lower alkyl; each $R^2$ is selected from alkyl, cycloalkyl, alkenyl, cycloalkenyl, aryl, and combinations thereof; such that the number of carbon atoms in said carbamic acid ester is in the range of 6 to 20.

3. The process according to claim 2 employing in the range of about 0.03 to 20 mhm carbamic acid ester.

4. The process according to claim 3 employing about 0.05 to 5 mhm carbamic acid ester.

5. The process according to claim 4 wherein said carbamic acid ester is ethyl N-benzyl-N-cyclopropylcarbamate.

6. The process according to claim 5 wherein said conjugated diene polymer is a polymer of butadiene or isoprene, optionally with styrene.

7. The process according to claim 1 or 6 wherein said alkali metal is selected from the group consisting of rubidium, cesium, potassium, sodium, and lithium.

8. The process according to claim 7 wherein said alkali metal is lithium.

9. The process according to claim 8 wherein said conjugated diene polymer is a butadiene-styrene resinous block copolymer containing about 70 to 95 weight percent copolymerized monovinylarene.

* * * * *

UNITED STATES PATENT AND TRADEMARK OFFICE
CERTIFICATE OF CORRECTION

PATENT NO. : 4,309,517
DATED : January 5, 1982
INVENTOR(S) : Kishore Udipi

It is certified that error appears in the above-identified patent and that said Letters Patent are hereby corrected as shown below:

Column 6, line 41, claim 4, at the beginning of the line and before "to", "0.05" should be --- 0.5 ---.

Signed and Sealed this

Twenth-eighth Day of September 1982

[SEAL]

Attest:

GERALD J. MOSSINGHOFF

Attesting Officer     Commissioner of Patents and Trademarks